(12) United States Patent
Lim et al.

(10) Patent No.: US 12,101,446 B2
(45) Date of Patent: Sep. 24, 2024

(54) GROUP BASED APPLICATION CONFIGURATION

(71) Applicant: Hewlett-Packard Development Company, L.P., Spring, TX (US)

(72) Inventors: Yeonjung Lim, Seongnam-si (KR); Giwon Seo, Seongnam-si (KR); Hyeongju Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/020,511

(22) PCT Filed: Feb. 10, 2021

(86) PCT No.: PCT/US2021/017358
§ 371 (c)(1),
(2) Date: Feb. 9, 2023

(87) PCT Pub. No.: WO2022/050981
PCT Pub. Date: Mar. 10, 2022

(65) Prior Publication Data
US 2023/0308563 A1 Sep. 28, 2023

(30) Foreign Application Priority Data
Sep. 1, 2020 (KR) .................. 10-2020-0110986

(51) Int. Cl.
*H04N 1/00* (2006.01)
(52) U.S. Cl.
CPC ..... *H04N 1/00511* (2013.01); *H04N 1/00482* (2013.01); *H04N 1/00938* (2013.01); *H04N 2201/3205* (2013.01)
(58) Field of Classification Search
None
See application file for complete search history.

(56) References Cited

U.S. PATENT DOCUMENTS

| 2004/0039811 A1 | 2/2004 | Nakamura et al. |
| 2008/0079975 A1 | 4/2008 | Ferlitsch et al. |

(Continued)

FOREIGN PATENT DOCUMENTS

| CN | 108712497 A | * 10/2018 | ........... G06F 9/4451 |
| CN | 111090440 A | * 5/2020 | ............... G06F 8/65 |

(Continued)

OTHER PUBLICATIONS

English translation of CN-108712497-A. (Year: 2018).*
English translation of CN-111090440-A. (Year: 2020).*

*Primary Examiner* — Thomas D Lee
(74) *Attorney, Agent, or Firm* — Brooks, Cameron & Huebsch, PLLC

(57) ABSTRACT

An example management server creates a group for synchronizing an application configuration, transmits a group identifier of the group to devices included in the group, maps configuration data of an application to the group identifier, stores the mapped configuration data, and transmits the configuration data to at least one device included in the group. When a configuration of an executed application is changed, a device checks whether a group identifier mapped to the application exists in a storage. When the group identifier exists, the device displays a message inquiring whether to propagate the changed configuration data of the application to the group to which the group identifier is assigned. When receiving a request to propagate the changed configuration data, the device provides the changed configuration data to a management server in a predetermined method. The group identifier is transmitted from the management server and stored in the storage.

15 Claims, 10 Drawing Sheets

(56) References Cited

U.S. PATENT DOCUMENTS

| | | |
|---|---|---|
| 2011/0134452 A1 | 6/2011 | Kim et al. |
| 2015/0254035 A1 | 9/2015 | Derouchie et al. |
| 2017/0090826 A1 | 3/2017 | Osadchyy et al. |

FOREIGN PATENT DOCUMENTS

| | | |
|---|---|---|
| JP | 2007-219953 A | 8/2007 |
| JP | 2011-235505 A | 11/2011 |
| JP | 2020-061018 A | 4/2020 |
| KR | 10-1614387 B1 | 4/2016 |

* cited by examiner

GROUP BASED APPLICATION CONFIGURATION

BACKGROUND

An administrator can install or uninstall an application on a remote device. When an installed application is executed, a device reads configuration data of the application and applies the configuration data. The administrator may select devices for which a change in the application configuration is required and transmit the configuration data to each device. The configuration data may include, for example, a print option, a scan option, information about a network connection, and the like.

DETAILED DESCRIPTION

Figure 1:
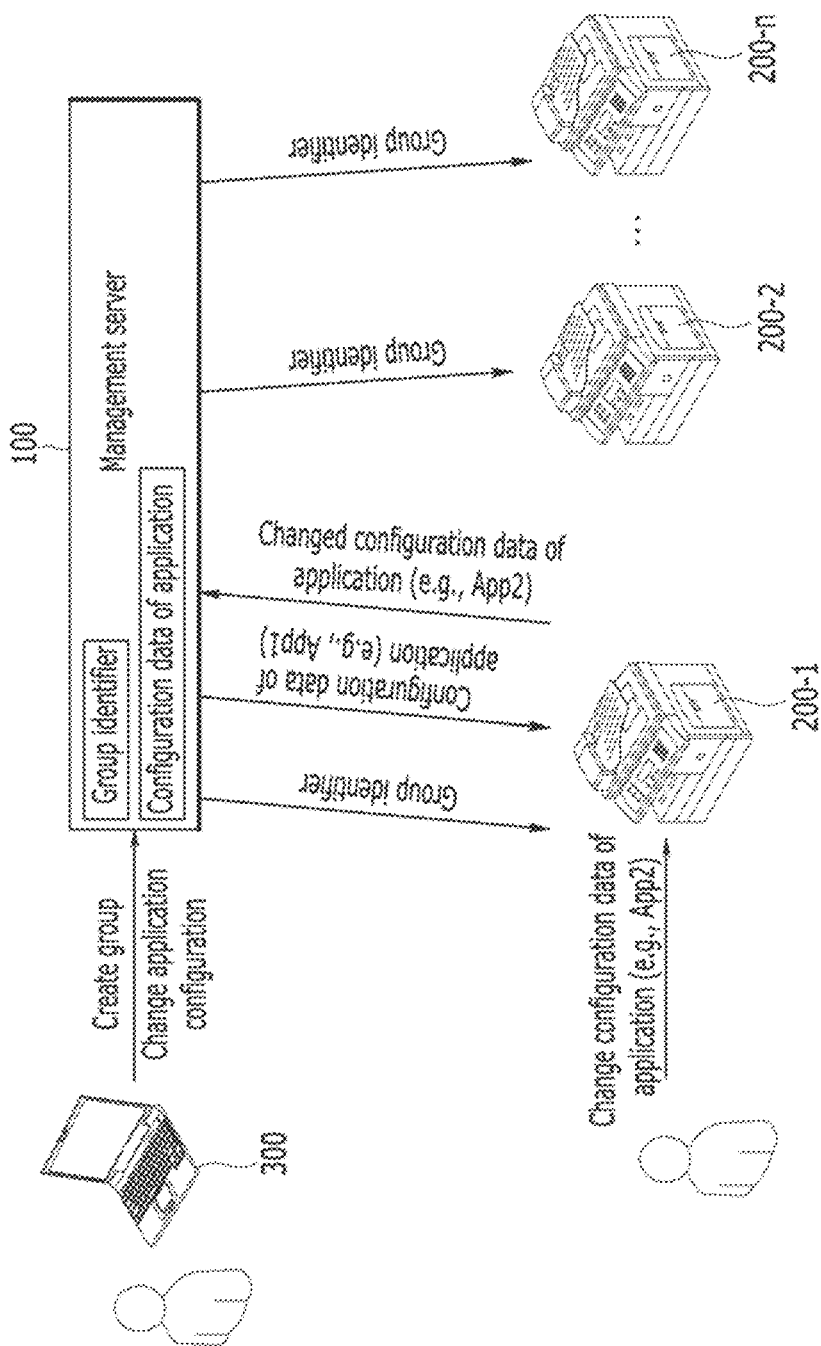
FIG. 1 illustrates a system according to an example.

In the description, it is assumed that an administrator has authority to manage a plurality of devices, to install or uninstall applications on remote devices, and to change configurations of applications installed on the devices. Administrator authority may be granted hierarchically. For example, there may be an administrator (e.g., master admin) with higher authority to access the management server to manage devices, to set up groups, to change configuration data of applications, etc., and there may be another administrator (e.g., device admin) with lower authority to manage some devices in a group.

When a change in an application configuration is required, the administrator may go to the device on which the application is installed, execute the application after logging in at the device, and change the configuration using a configuration menu in person. In this case, the administrator should go to each of the devices in person, and repeatedly change the configurations for each device.

Alternatively, the administrator may log in to a management server connected with devices via a network and change application configurations remotely. In addition, after selecting devices to which the changed configuration data is to be applied, the administrator may push the configuration data to the selected devices. Accordingly, the administrator can remotely change the application configurations of the devices. However, for this process, the administrator may have to log in to the management server via an administrator terminal (e.g., a mobile terminal, a notebook computer, etc.) and have to select devices to which the changed configuration data of the application is applied. Whenever the application configurations should be changed, the administrator synchronizes the configurations of the application installed in a plurality of devices through such a series of procedures, but repetitive tasks still exist.

In order to address these and other problems, an example management server may manage devices that identically maintain application configuration as a group, and map the application configuration data to a group identifier for management. The application configuration data may be transmitted to at least one device in a push method or a pull method. For example, the management server may push the configuration data of the application to devices belonging to the group. Alternatively, the management server may transmit application configuration data to the device according to a request from a device belonging to the group.

An example device of the present disclosure may store a group identifier. The device may receive and store configuration data of an application mapped to the group identifier from the management server. When the application is executed, the device may retrieve the stored configuration data and apply it to the application. Alternatively, when the application mapped to the group identifier is executed, the device may retrieve configuration data of the application mapped to the group identifier from the management server and apply it to the application.

When an application configuration is changed in the configuration menu, an example device of the present disclosure may display a message inquiring whether to apply the changed configuration data to other devices belonging to the group, and transmit the changed configuration data to the management server according to the administrator's selection. The changed configuration data may be transmitted from the device to the management server upon request from the administrator. Alternatively, the management server may identify the changed configuration data in the device, read a group propagation consent for the changed configuration data, and fetch the configuration data. The management server stores the configuration data changed in the device as configuration data of the application mapped to the group identifier. The management server may push the configuration data of the application to the devices belonging to the group or transmit the configuration data to a device that requested the configuration data of the application. As a result, configuration data changed in the device may be propagated to other devices in the group, so that application configurations can be synchronized.

According to examples of the present disclosure, it is possible to reduce repetitive tasks that the administrator should perform to change application configurations in a plurality of devices.

According to examples of the present disclosure, when an administrator changes an application configuration in a device belonging to a group, since the management server fetches the changed configuration data from the device and stores it as the configuration data of the application, there is no need to log in to the management server and change the application configuration additionally. According to examples of the present disclosure, since configuration data changed in a device is transmitted to other devices in a group, cumbersome and repetitive tasks of changing configurations are omitted, and the application configuration of the group can be easily synchronized.

Hereinafter, examples of the present disclosure will be described with reference to the accompanying drawings so that those of ordinary skill in the art may easily implement the present disclosure. However, the present disclosure may be implemented in various different forms and is not limited to the examples described herein. In the drawings, like reference numerals designate like elements throughout the specification.

Throughout the specification, when a part is referred to "include" a certain element, it means that it may further include other elements rather than exclude other elements, unless specifically indicates otherwise.

In the description, the terms "transmit" or "provide" may be used to include not only direct transmission or provision but also indirect transmission or provision through another device or by using a bypass.

Throughout the specification, the singular forms "a", "an", and "the" are intended to include the plural forms as well, unless the explicit expression such as "one" or "singular" is used.

In the description, an operation order described in a flowchart may be changed, several operations may be merged, certain operations may be divided, and specific operations may not be performed.

In the description, the terms such as " . . . unit", " . . . er", " . . . or", " . . . module", and the like refer to units that process at least one function or operation, which may be implemented with a hardware, a software or a combination thereof.

In the description, each of a device and a server comprises hardware including a processor, a memory, a communication device, and the like, and a computer program executed in combination with the hardware is stored in a predetermined space. The hardware may have a configuration and performance available for implementing an example method of the present disclosure. The computer program may include instructions for implementing an example operation method of the present disclosure described with reference to the accompanying drawings and may execute the present disclosure in combination with hardware such as a processor and a memory.

In the description, the type of device need not be limited, and a device capable of operating by driving a program including instructions for executing an operation according to an example of the present disclosure is sufficient. For example, the device may be an image forming apparatus that generates, prints, receives, and transmits image data. The image forming apparatus may be, for example, a printer, a scanner, a copier, a fax machine, or a multi-function device incorporating these functions. In the description, the multi-function device may be described as an example.

Hereinafter, an example of a group-based application configuration change will be described.

Figure 2:
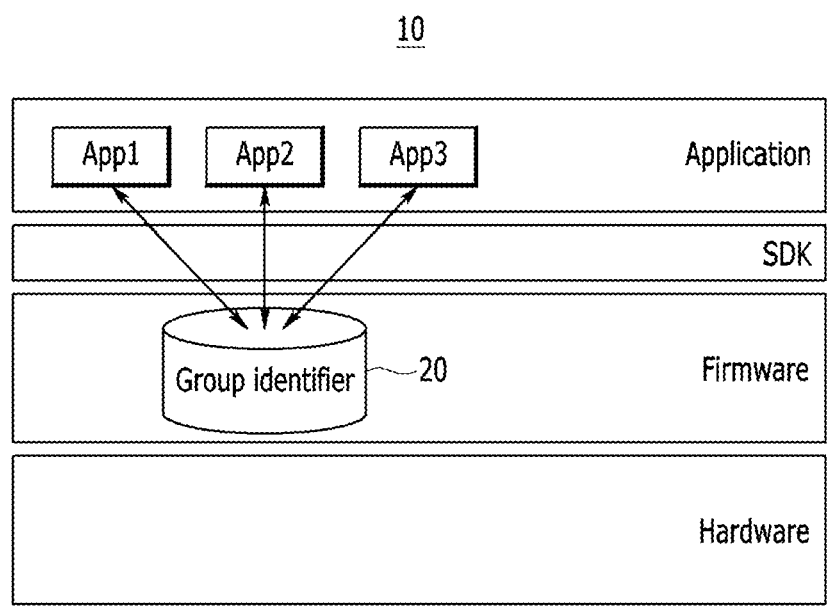
FIG. 2 illustrates a group identifier stored in a device according to an example.
Figure 3:
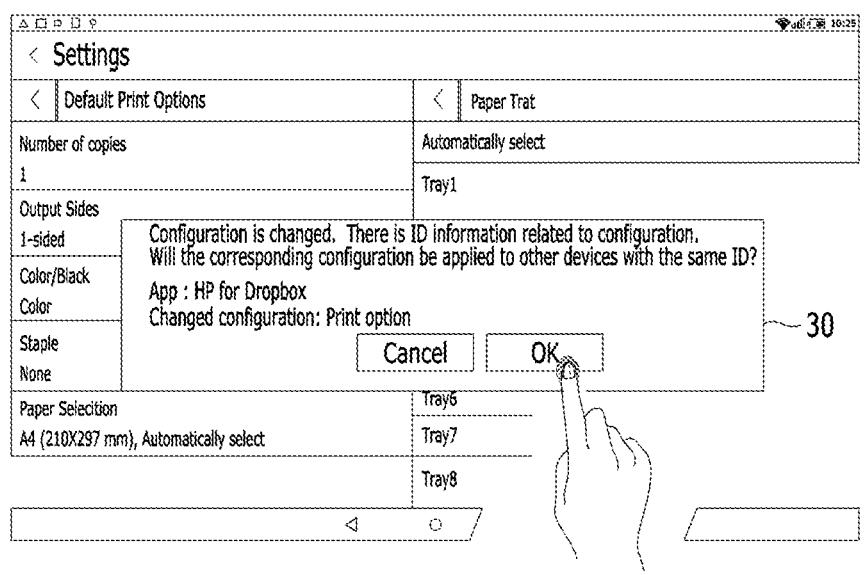
FIG. 3 illustrates a screen displayed on a device according to an example.

FIG. 1 illustrates a system according to an example, FIG. 2 illustrates a group identifier stored in a device according to an example, and FIG. 3 illustrates a screen displayed on a device according to an example.

Referring to FIG. 1, a management server 100 may be connected to devices 200-1, 200-2, . . . , and 200-*n* via a network, manage information of the devices 200-1, 200-2, . . . , and 200-*n*, store applications that may be installed on the devices 200-1, 200-2, . . . , and 200-*n*, and store configuration data of the applications. The management server 100 may provide a management screen to an administrator terminal 300, install or uninstall an application on the devices 200-1, 200-2, . . . , and 200-*n* according to an administrator request input from the management screen, and provide the configuration data of the application to the devices 200-1, 200-2, . . . , and 200-*n*. Here, the administrator may log in to the management server 100 via the administrator terminal 300 and may install or uninstall applications and change the application configuration.

The management server 100 may receive a request from the administrator terminal 300 to create a group for which the application configuration is synchronized. The group may include devices that are chosen to apply the same configuration data when the application configuration is changed. For example, when a dealer, a site manager, a company manager, and the like want to identically manage the configurations of the applications installed on the devices 200-1, 200-2, . . . , and 200-*n*, a request to create a group including the devices 200-1, 200-2, . . . , and 200-*n* may be made. Alternatively, when the administrator wants to identically manage the configuration of a specific application, a request to create a group including some devices where the specific application is installed may be made.

The management server 100 may group the devices 200-1, 200-2, . . . , and 200-*n* into a group in which the application configuration is synchronized, and transmit a group ID to the devices belonging to the group. The management server 100 may map the group identifier to an application installed in the devices, may map configuration data of the application to the group identifier, and may store the mapped configuration data. Thereafter, the management server 100 may transmit the configuration data to devices belonging to the group according to a policy. Here, the policy may include various configurations for identically maintaining the devices in the group and may include, for example, configuration data of a device, applications installed on the device, configuration data of each application, and the like.

As examples of a method of applying the policy to a device, a push method in which the management server applies configuration data to the device and a pull method in which the device fetches the configuration data from the management server and applies it may be supported. For example, when the policy is applied by a push method, the management server 100 may push the application configuration data to the devices 200-1, 200-2, . . . , and 200-*n* belonging to the group. For example, upon detecting a change in the application configuration data, the management server 100 may push the changed configuration data to the devices 200-1, 200-2, . . . , and 200-*n* belonging to the group. The management server 100 may periodically check a configuration of a device and the configuration data of the application. If the checked configuration of the device is different from the policy, the management server 100 may push the configuration data defined in the policy to the corresponding device. Alternatively, when a policy is applied by a pull method, the management server 100 may transmit the configuration data of the application to a device according to a request received from the device belonging to the group.

In order to inform the device of applications mapped to the group identifier, the management server 100 may map an application identifier to the group identifier and transmit the group identifier.

For example, as shown in Table 1, the management server 100 may map an application whose configuration is synchronized with devices belonging to a group on a group basis to a group identifier and manage the applications. According to Table 1, for devices grouped as group1, all installed applications may be configured identically. For devices grouped as group2, App1 and App2 may be configured identically. For devices grouped as group3, App1 may be configured identically.

TABLE 1

| Group ID | Device (Model/Serial NO.) | Application |
|---|---|---|
| group1 | HP SCANJET FLOW N9120 FN/Serial No.: CN79136512<br>Model: HP SCANJET FLOW N9120 FN/Serial No.: CN78321231<br>Model: HP SCANJET FLOW N9120 FN/Serial No.: CN88612122<br>Model: HP COLOR LASERJET MFP E77830/Serial No.: CN7834463<br>Model: HP COLOR LASERJET MFP E77830/Serial No.: CN7984536 | all |
| group2 | Model: HP COLOR LASERJET MFP E77830/Serial No.: CN6812121<br>Model: HP COLOR LASERJET MFP E77830/Serial No.: CN154544 | App1 (e.g., HP for iManage)<br>App2 (e.g., HP for Dropbox) |
| group3 | Model: HP SCANJET FLOW N9120 FN/Serial No.: CN12154564<br>Model: HP PAGEWIDE COROR MFP 586/Serial No.: CN2654889 | App1 |

After at least one group is created, a device may be added. Through the configuration page provided by the management server 100, the administrator may check a list of group identifiers assigned to devices as shown in Table 1 and may determine whether to add a new device to an existing group or to create a new group including the new device. After it is determined to which group the new device is to belong, the management server 100 may transmit the group identifier to the new device. The new device that has received the group identifier may maintain application configuration identically on a group basis.

The management server 100 may store configuration data of an application. For example, the management server 100 may store configuration data of App1, App2, and App3 as shown in Table 2. The configuration data of App1 may include, for example, a server address (serverAddress) for application configuration (appConfig), and the configuration data of App2 may include, for example, print configuration (printConfig) and scan configuration (scanConfig). Further, the configuration data of App3 may include, for example, print configuration (printConfig).

TABLE 2

| App. | Application configuration data |
|---|---|
| App1 | {<br>"schemaVersion": "0.1",<br>"id": " App1",<br>"date": "2020-05-20 14:56",<br>"frames": [<br>{<br>"id": "appConfig",<br>"fidgets": [<br>{<br>"id": "ServerAddress",<br>"sets": [<br>{<br>"key": "server_address",<br>"items": [<br>{<br>"key": "server_address",<br>"value": "http://my-server.com"<br>}]}]}]}]} |
| App2 | {<br>"schemaVersion": "0.1", |

TABLE 2-continued

| App. | Application configuration data |
|---|---|
| | "id": " App2",<br>"date": " 2020-05-22 09:32 ",<br>"frames": [<br>{<br>"id": "printConfig",<br>"fidgets": [<br>{<br>"id": "printColorMode",<br>"sets": [<br>{<br>"key": "printColorMode",<br>"items": [<br>{<br>"key": "MONO",<br>"value": "true"<br>}]}]}]},<br>{<br>"id": "scanConfig",<br>"fidgets": [<br>{<br>"id": "scanFileType",<br>"sets": [<br>{<br>"key": "scanFileType",<br>"items": [<br>{<br>"key": "XPS",<br>"value": "true"<br>}]}]}]}]} |
| App3 | {<br>"schemaVersion": "0.1",<br>"id": " App3",<br>"date": "2020-06-20 13:05",<br>"frames": [<br>{<br>"id": "printConfig",<br>"fidgets": [<br>{<br>"id": "printColorMode",<br>"sets": [<br>{<br>"key": "printColorMode",<br>"items": [<br>{<br>"key": "MONO",<br>"value": "true"<br>}]}]},<br>{<br>"id": "printOutputSides",<br>"sets": [<br>{<br>"key": "printOutputSides",<br>"items": [<br>{<br>"key": "BOOK",<br>"value": "true"<br>}]}]}]}]} |

The management server 100 may manage the applications mapped to groups as shown in Table 3. The configuration data of each application may be stored as shown in Table 2. Furthermore, the configuration data of the application may be different for each group. For example, though App1 is installed on several devices, applied configuration data of App 1 may vary depending on the group.

TABLE 3

| Group ID | App ID | Application configuration data |
|---|---|---|
| group1 | App1 | configuration data for App1 |
| group1 | App2 | configuration data for App2 |
| group1 | App3 | configuration data for App3 |
| group2 | App1 | configuration data for App1 |

TABLE 3-continued

| Group ID | App ID | Application configuration data |
|---|---|---|
| group2 | App2 | configuration data for App2 |
| group3 | App1 | configuration data for App1 |

According to an example, the management server 100 may provide a configuration page to the administrator terminal 300 which logged in to the management server 100, and receive configuration data input from the configuration page. When the administrator changes the configuration data of an application on the configuration page, the management server 100 may inquire as to which group will apply the changed configuration data. The administrator may request the management server 100 to apply the changed configuration data to a previously created group. Otherwise, the administrator may create a new group, and request the management server 100 to apply the changed configuration data to the new group. When the new group is created, the management server 100 may transmit a group identifier to devices belonging to the group.

According to an example, a management server 100 may receive configuration data changed in a device. For example, an administrator may execute an application on a device 200-1 and change the configuration in a configuration menu of the application. When the administrator wants to apply the changed configuration data to other devices, the administrator may request group propagation of the changed configuration data. In that case, the device 200-1 may push the changed configuration data to the management server 100. Otherwise, after the device 200-1 records a group propagation request for the changed configuration data, the management server 100 may check the group propagation request for the configuration data, and may fetch the configuration data for which the group propagation request is made from the device 200-1.

In an example, administrator authority may be granted hierarchically, and an allowance policy including whether to allow group propagation of changed configuration data requested from a device unconditionally or after approval of a master administrator may be predefined. For example, a device manager with management authority for some devices in the group may change the configuration data in the device 200-1 and request group propagation of the changed configuration data. In a case where it is defined that the group propagation is made after the administrator's approval in the allowance policy, if a device administrator does not have an authority to manage the group, the management server 100 may inquire of the master administrator having authority of group management whether to approve a group propagation of the configuration data changed in the device 200-1. After receiving the approval for the group propagation from the master administrator, the management server 100 may propagate the configuration data changed in the device 200-1 to other devices.

Hereinafter, example operations of a device will be described.

Devices 200-1, 200-2, . . . , and 200-n belonging to the group may receive a group identifier from the management server 100. Each device may store the group identifier in a predetermined storage. Applications triggered to change configurations may be mapped to the group identifier, or all installed applications may be prescribed to be triggered by the group identifier.

Referring to FIG. 2, the group identifier may be stored, for example, on a storage 20 of firmware in a stack 10 of the device. The group identifier may be maintained in the storage 20 even though applications App1, App2, and App3 of the application layer are removed. An executed application may check whether there is a mapped group identifier in the storage 20.

Referring back to FIG. 1, operations of the device 200-1 and the device 200-2 among devices belonging to the group will be described as an example. The device 200-1 may obtain configuration data of an application mapped to the group identifier.

According to an example, the device 200-1 may receive configuration data of an application mapped to a group identifier from the management server 100 and store the configuration data. When the application is executed, the device 200-1 may fetch the stored configuration data and apply it to the application.

According to an example, when an application App1 among installed applications App1, App2, and App3 is executed, the device 200-1 may check whether a group identifier mapped to the executed application App1 exists. If the group identifier exists, the device 200-1 may request configuration data of an application mapped to the group identifier from the management server 100 and fetch the requested configuration data. A time when the group identifier mapped to the application is checked and configuration data is requested may be variously set up. The group identifier may be checked and the configuration data may be requested whenever the application is executed or periodically, such as each day, each week, each month, and the like. Alternatively, the device 200-1 may transmit version information of the current configuration data to the management server 100 and obtain the changed configuration data.

The device 200-1 may apply the received configuration data to the executed application. For example, the device 200-1 may receive the configuration data of App1 in Table 2 and apply the changed server address. As a result, App1 can access the changed server address.

If the group identifier mapped to the executed application does not exist, the device 200-1 may apply the stored configuration data or a default value to the application.

Alternatively, the device 200-1 may be configured so as not to fetch application configuration data even if the group identifier exists. In that case, the device 200-1 may omit a procedure to check a group identifier applied to the executed application or may omit a procedure to request configuration data from the management server 100 even though the group identifier is checked.

Referring to FIG. 3, the administrator may execute any application (e.g., App2) on the device 200-1 and change a configuration in the configuration menu of the application. The device 200-1 may check whether a group identifier mapped to the application whose configuration has been changed exists. If the group identifier exists, the device 200-1 may display a message 30 inquiring whether to apply the changed configuration data to other devices in the group. The device 200-1 may receive a request for propagation to other devices in the group from the administrator.

Upon receiving a request for the group propagation of changed configuration data, the device 200-1 may transmit the changed configuration data to the management server 100. The changed configuration data of the application and the group identifier may be transmitted to the management server 100.

Alternatively, the device 200-1 may record a group propagation request for the changed configuration data. Thereafter, the management server 100 may read the group propagation request stored in the device 200-1 at a predetermined time and fetch the configuration data for which the group propagation request is made from the device 200-1.

The management server 100 may map the configuration data of App2 changed in the device 200-1 to a group identifier and store the mapped configuration data. The management server 100 may update the configuration data in Table 2 or Table 3.

Thereafter, the management server 100 may push the configuration data of App2 to devices belonging to the group.

Alternatively, according to a request from a device belonging to the group, the management server 100 may transmit configuration data of an application to the device. For example, when App2 is executed in the device 200-2 belonging to the same group as the device 200-1, the device 200-2 may check whether a group identifier mapped to the executed application exists. Since the group identifier exists, the device 200-2 may transmit the group identifier and an application identifier to the management server 100 and obtain configuration data of the executed application. The device 200-2 may apply the configuration data to the executed application. Here, the configuration data received by the device 200-2 may be configuration data changed in another device 200-1 belonging to the group.

Figure 4:
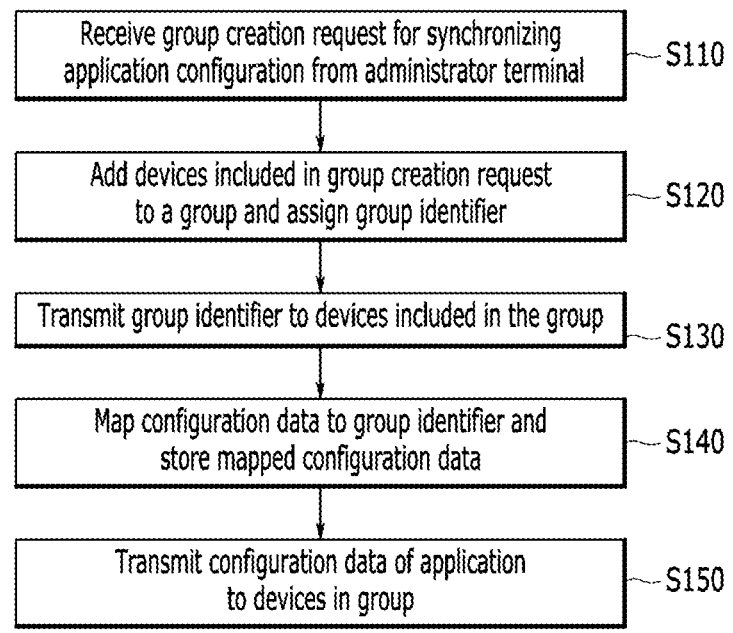
FIG. 4 is a flowchart of a method for changing an application configuration on a group basis by a management server according to an example.

FIG. 4 is a flowchart of a method for changing an application configuration on a group basis by a management server according to an example.

Referring to FIG. 4, the management server 100 receives a group creation request for synchronizing an application configuration from the administrator terminal 300 in operation S110.

The management server 100 adds devices included in the group creation request to a group and assigns a group identifier in operation S120.

The management server 100 transmits the group identifier to the devices included in the group in operation S130. An application identifier mapped to the group identifier and a policy of the group identifier may be transmitted along with the group identifier. When the push method is set for the group identifier, the application mapped to the group identifier may read and apply pre-stored configuration data. When a pull method is set for the group identifier, the application mapped to the group identifier is triggered to change the configuration by fetching the configuration data mapped to the group identifier from the management server 100.

The management server 100 maps the configuration data of the application to a group identifier and stores the mapped configuration data in operation S140. The management server 100 may store the configuration data determined in an administrator terminal 300 or may store configuration data changed in any device belonging to the group.

The management server 100 transmits the configuration data of the application to devices in the group in operation S150. When a push method is designated, the management server 100 may push the configuration data of the application to devices 200-1, 200-2, . . . , and 200-n belonging to the group. When detecting a change in the configuration data, the management server 100 may push the changed configuration data to devices belonging to the group. The management server 100 may periodically check device configurations and the configuration data of the application, and push the configuration data defined in the policy to the corresponding device when the checked configurations are different from the policy. Alternatively, when a pull method is designated, the management server 100 may transmit the configuration data of the application to the device according to a request from the device belonging to the group. The device that received the configuration data applies the configuration data to the application.

Figure 5:
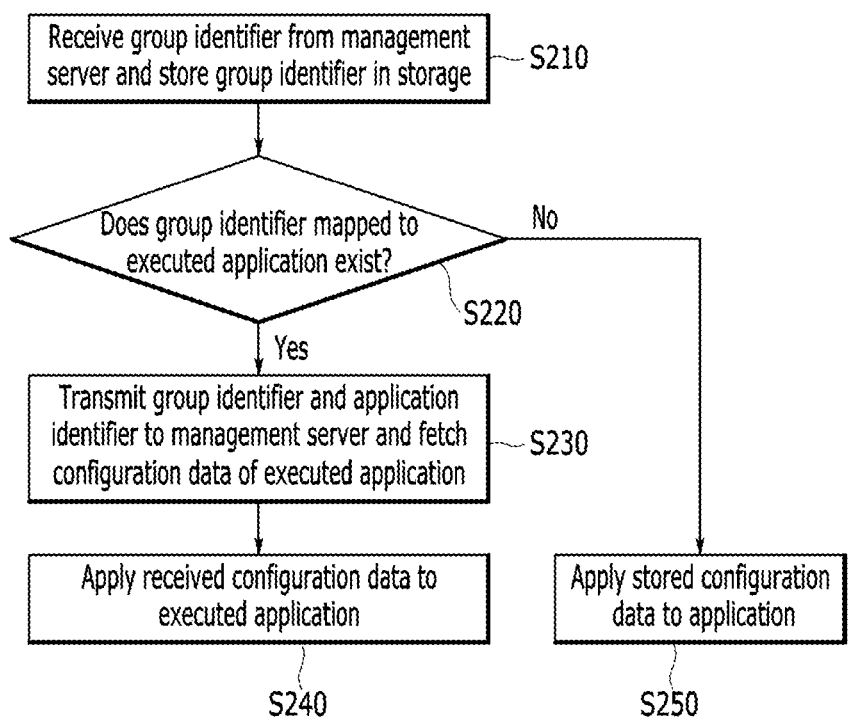
FIG. 5 is a flowchart of a method for changing application configurations on a group basis by a device according to an example.

FIG. 5 is a flowchart of a method for changing application configurations on a group basis by a device according to an example.

Referring to FIG. 5, a device receives a group identifier from a management server 100 and stores the group identifier in a storage in operation S210. Along with a group identifier, an application identifier triggered to change configurations by the group identifier may be stored.

When an application is executed, the device checks whether a group identifier mapped to the executed application exists in operation S220.

If the group identifier exists, the device transmits the group identifier and the application identifier to the management server 100 and obtains configuration data of the executed application in operation S230. At this time, the device may transmit version information of the configuration data stored therein to the management server 100 and fetch the changed configuration data.

The device applies the received configuration data to the executed application in operation S240.

If the group identifier mapped to the executed application does not exist, the device 200-1 applies stored configuration data to the application in operation S250. If there is no stored configuration data, the configuration is operated with a default value.

The device may be set up so as not to fetch the application configuration data even though the group identifier exists. In that case, the device may omit a procedure to check a group identifier applied to the executed application or omit a procedure to request configuration data from the management server 100 even if the group identifier is checked.

Figure 6:
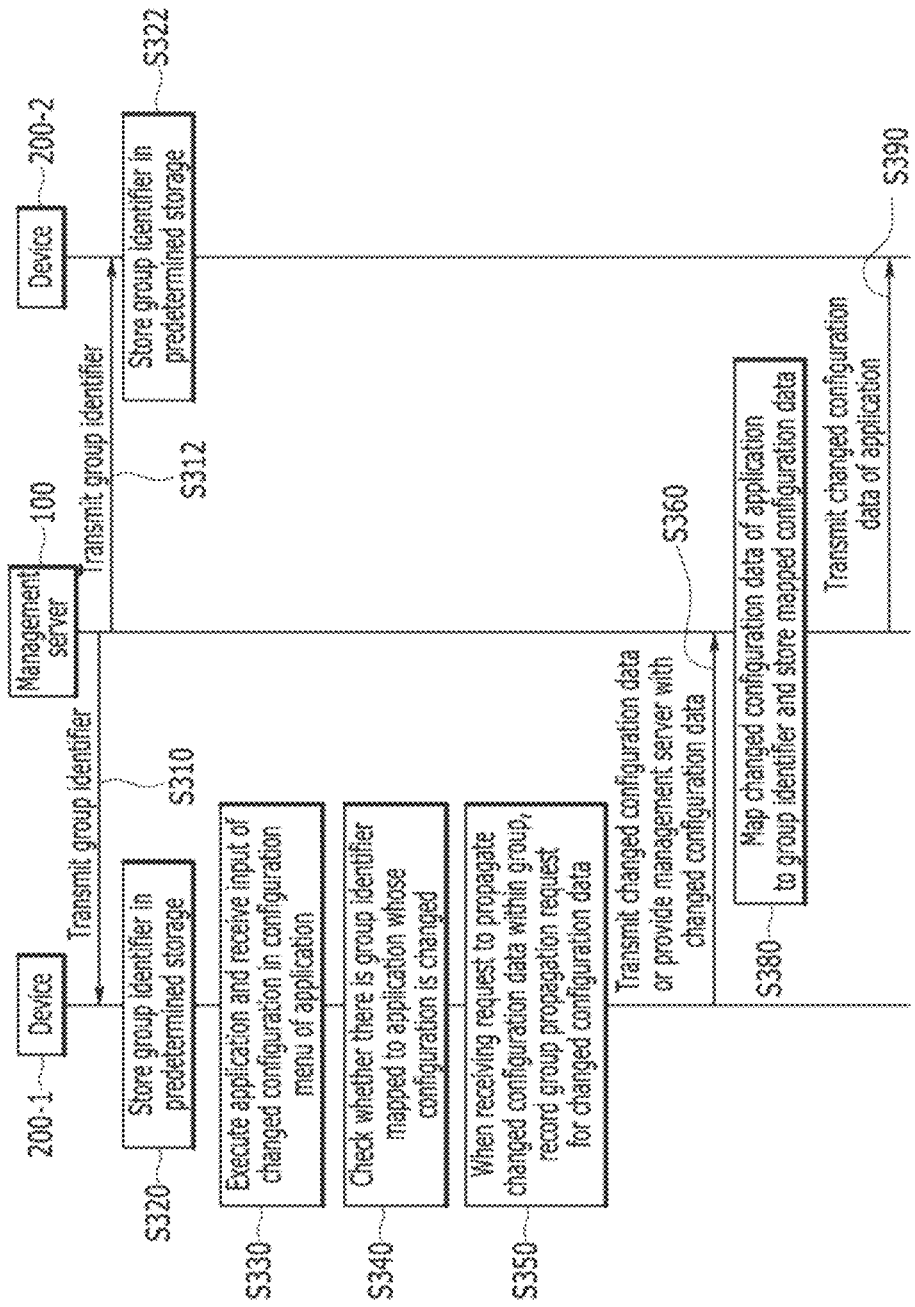
FIG. 6 is a flowchart showing a method of applying a configuration changed in a device to a group according to an example.

FIG. 6 is a flowchart showing a method of applying a configuration changed in a device to a group according to an example.

Referring to FIG. 6, the management server 100 transmits a group identifier to a device 200-1 in operation S310 and to a device 200-2 in operation S312.

The device 200-1 and the device 200-2 store the group identifier in a predetermined storage in operations S320 and S322, respectively.

The device 200-1 executes an application and receives an input of a changed configuration from configuration menu of the application in operation S330. As an example, the device 200-1 may fetch configuration data of the application from a management server 100, execute the application, and receive the input of the changed configuration from the configuration menu.

The device 200-1 checks whether there is a group identifier mapped to the application whose configuration has been changed in operation S340.

If there is the group identifier, the device 200-1 displays a message inquiring whether to apply the changed configuration data to other devices in the group.

Upon receiving a request to propagate the changed configuration data within a group, the device 200-1 records a group propagation request for the changed configuration data in operation S350. When the changed configuration data is not propagated within the group, the device 200-1 may store the changed configuration data and apply the changed configuration data to the application.

In operation S360, the device 200-1 transmits the changed configuration data to the management server 100 or provides the changed configuration data to the management server 100 so that the management server 100 can take the configuration data. The management server 100 may check the group propagation request recorded in the device 200-1 at a predetermined time and may fetch from the device 200-1 the configuration data for which group propagation is requested. While periodically checking device configuration and configuration data of applications, the management server 100 may identify configuration data of an application different from the policy. At this time, since the group propagation request is recorded in the configuration data, the management server 100 may fetch the configuration data different from the policy.

The management server 100 maps the changed configuration data of the application to the group identifier and stores the changed configuration data in operation S380.

The management server 100 transmits the changed configuration data of the application to the device 200-2 in operation S390. When a push method is designated, the management server 100 may transmit the changed configuration data of the application to devices belonging to the group including the device 200-2. Alternatively, when a pull method is designated, upon receiving a request for the configuration data of the application mapped to a group identifier from the device 200-2 included in the group, the management server 100 may transmit the requested configuration data to the device 200-2. In this case, if the application mapped to the group identifier is executed as in the example described in FIG. 5, the device 200-2 may request the configuration data of the executed application from the management server 100.

As a result, when an administrator changes the application configuration on a device in a group, the configuration data changed in a local device can be applied to other devices in the group. The administrator may apply the configuration data changed in the device identically within the group, without additionally changing the application configuration by logging in to the management server 100 via the administrator terminal 300.

Figure 7:
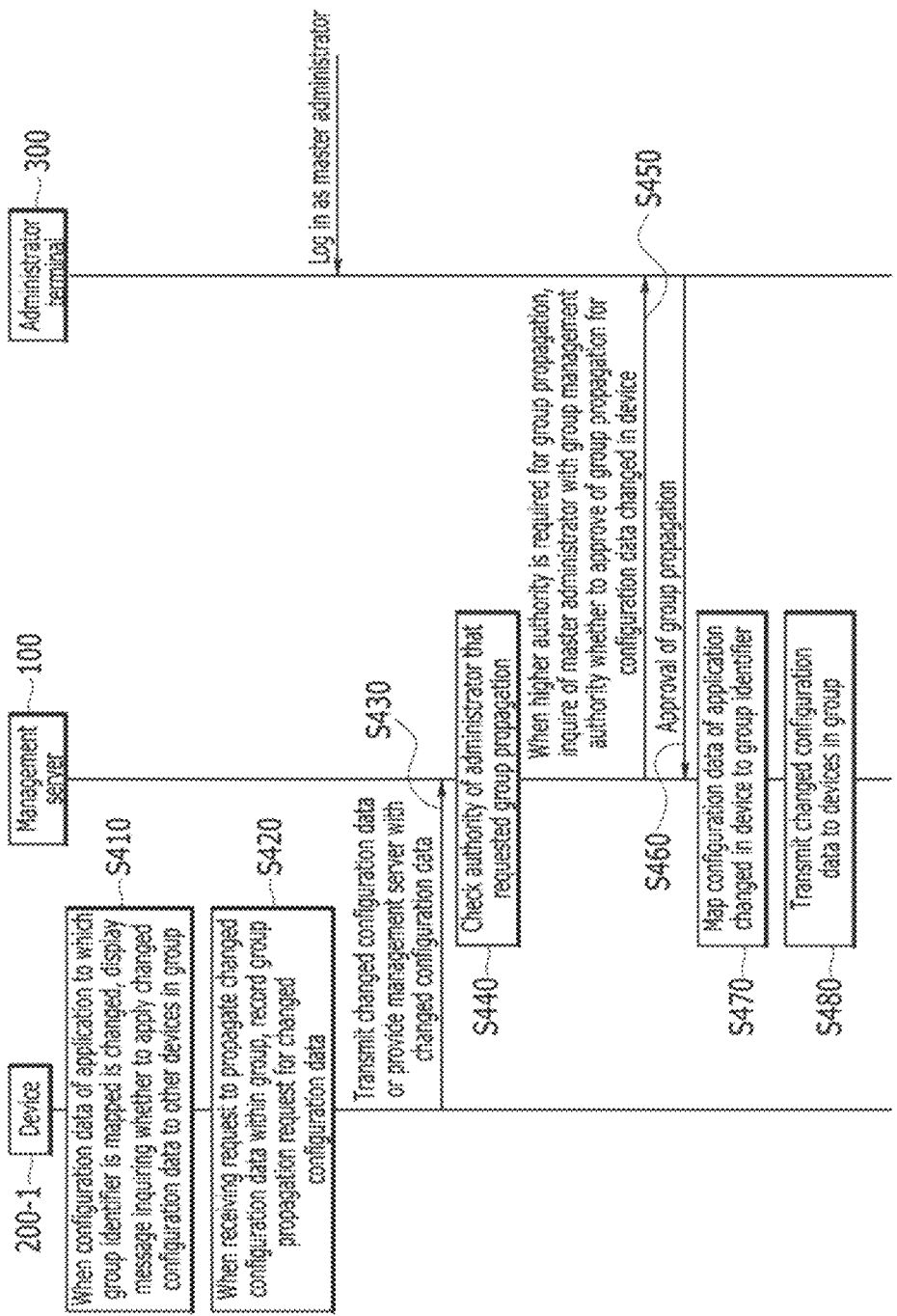
FIG. 7 is a flowchart showing a method of applying a configuration changed in a device to a group according to an example.

FIG. 7 is a flowchart showing a method of applying configuration changed in a device to a group according to an example.

Referring to FIG. 7, when configuration data of an application to which a group identifier is mapped is changed, the device 200-1 displays a message inquiring whether to apply the changed configuration data to other devices in the group in operation S410.

When receiving a request to propagate the changed configuration data within the group, the device 200-1 records a group propagation request for the changed configuration data in operation S420.

The device 200-1 transmits the changed configuration data to the management server 100 or provides the changed configuration data to the management server 100 in operation S430.

The management server 100 checks the authority of an administrator having requested the group propagation in operation S440.

When a higher authority is required for group propagation according to the defined allowance policy, the management server 100 inquires of a master administrator with group management authority whether to approve of the group propagation of the configuration data changed in the device 200-1 in operation S450. If the allowance policy is configured to unconditionally allow the group propagation of changed configuration data requested by the device 200-1, the management server 100 may immediately allow the group propagation of the changed configuration data.

The management server 100 obtains an approval of group propagation from the administrator terminal 300 logged in as the master administrator in operation S460.

The management server 100 maps the configuration data of the application changed in the device 200-1 to the group identifier and stores the changed configuration data in operation S470.

The management server 100 transmits the changed configuration data of the application to the devices within the group in operation S480.

Figure 8:
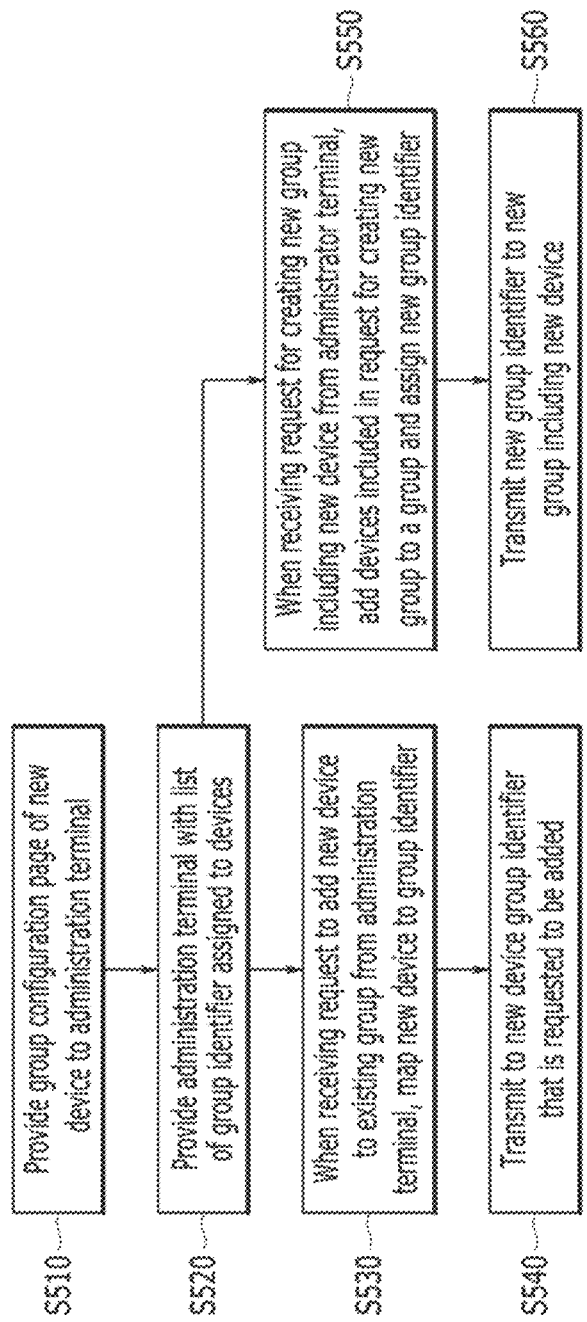
FIG. 8 is a flowchart showing a method of adding a new device to a group according to an example.

FIG. 8 is a flowchart showing a method of adding a new device to a group according to an example.

Referring to FIG. 8, the management server 100 provides a page for setting a group of a new device to the logged-in administrator terminal 300 in operation S510.

The management server 100 provides the administrator terminal 300 with a list of group identifiers assigned to devices in operation S520.

Upon receiving a request to add a new device to an existing group from the administrator terminal 300, the management server 100 maps an additional device to the group identifier in operation S530. The administrator may add the new device to the existing group by selecting a certain group identifier from the group identifier list.

The management server 100 transmits to the new device the group identifier requested to be added in operation S540.

When receiving a request for creating a new group including the new device from the administrator terminal 300, the management server 100 adds devices included in the request for creating a new group to a group and assigns a new group identifier in operation S550.

The management server 100 transmits the new group identifier to the new group including the new device in operation S560.

The new device that received the group identifier may maintain the application configuration on a group basis.

Figure 9:
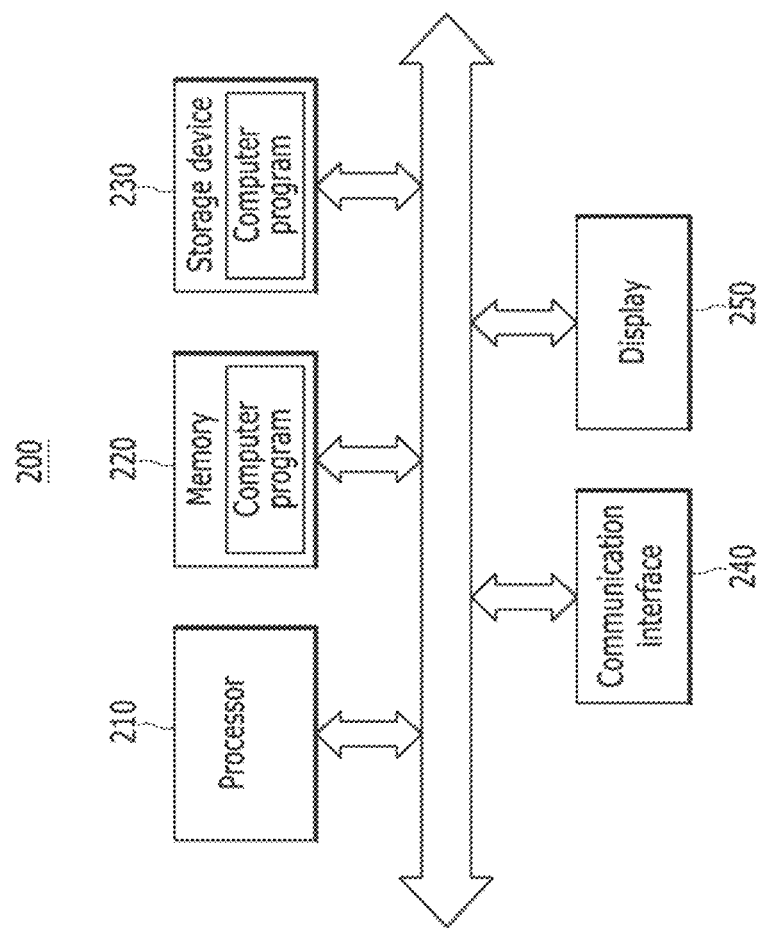
FIG. 9 is a block diagram of a device according to an example.

FIG. 9 is a block diagram of a device according to an example.

Referring to FIG. 9, the device 200 may include not only hardware and software for generating, printing, receiving, and transmitting image data but also may be implemented with a computing device that executes a computer program including instructions to perform example operations of the present disclosure.

The device 200 may include a processor 210, a memory 220, a storage device 230, a communication interface 240, and a display 250, which may be connected via a bus. In addition, the device 200 may include hardware and software for generating, printing, receiving, and transmitting image data, which are omitted in the drawings. The computer program includes instructions to perform example operations of the device and method described above, and may include applications installed in the device 200.

The processor 210 may control an operation of the device 200, and may be various types of processors that process instructions included in a computer program. For example, the processor 210 may be a central processing unit (CPU), a micro processor unit (MPU), a micro controller unit (MCU), a graphic processing unit (GPU), and the like.

The memory 220 may store various types of data, commands, and/or information. The memory 220 may load a corresponding computer program from the storage device 230 so that the instructions described to perform an example operation of the present disclosure are processed by the processor 210. The memory 220 may be, for example, a read only memory (ROM), a random access memory (RAM), or the like. The storage device 230 may store various types of data, computer programs, and the like required to perform an example operation of the present disclosure. The storage device 230 may non-temporarily store a computer program. The storage device 230 may be implemented with a nonvolatile memory. The storage 20 for storing group identifiers may be located in a partial area of the storage device 230 for storing firmware.

The communication interface 240 may be a wired/wireless communication module (e.g., a transceiver).

The display 250 may display a user interface screen of a computer program.

The computer program including instructions for performing example operations of the present disclosure is stored in a medium readable by a computing device, and the medium readable by the computing device may be a removable recording medium or a fixed recording medium. The computer program may be transmitted to another computing device via a network such as Internet, and installed and executed on another computing device.

The processor 210 may execute instructions of a computer program loaded on the memory 220, and the computer program may include instructions described to perform example operations of the present disclosure.

The processor 210 may store a group identifier received from the management server 100 in the storage.

The processor 210 may receive and store configuration data of an application mapped to a group identifier, and may fetch the stored configuration data and apply the configuration data to the application when the application is executed.

When the application is executed, the processor 210 may check whether a group identifier mapped to the executed application exists. If the group identifier exists, the processor 210 may transmit the group identifier and an application identifier to the management server 100 and may obtain the configuration data of the executed application. The processor 210 may apply the received configuration data to an executed application.

When the changed configuration is input from the configuration menu of the executed application, the processor 210 checks whether there is a group identifier mapped to the application whose configuration is changed. If there is the group identifier, the processor 210 may display a message inquiring whether to apply the changed configuration data to other devices within the group. When requested to propagate the changed configuration data within a group, the processor 210 may provide the management server 100 with the changed configuration data of the application using a predetermined method. Here, the predetermined method may include a push method where the device 200 transmits the changed configuration data of the application to the management server 100 or a pull method where the management server 100 fetches the configuration data from the device 200.

The computer program installed in the device 200 may include instructions and may be stored in a non-transitory computer readable storage medium.

The computer program of the device 200 may include instructions for storing a group identifier received from the management server 100 in the storage.

The computer program of the device 200 may include instructions for receiving configuration data of an application mapped to a group identifier and for storing the mapped configuration data, and instructions for fetching the stored configuration data and applying the configuration data to the application when the application is executed.

The computer program of the device 200 may include instructions for checking whether a group identifier mapped to the executed application exists when the application is executed, instructions for transmitting a group identifier and an application identifier to the management server 100 and for fetching the configuration data of the executed application when the group identifier exists, and instructions for applying the received configuration data to the executed application.

The computer program of the device 200 may include instructions for receiving an input for changing a configuration from a configuration menu of the executed application, instructions for checking whether there is a group identifier mapped to the application whose configuration is changed, instructions for displaying a message inquiring whether to apply the changed configuration data to other devices within the group when there is the group identifier, and instructions for providing the management server 100 with the changed configuration data of the application in a predetermined method when requested to propagate the changed configuration data within the group.

Figure 10:
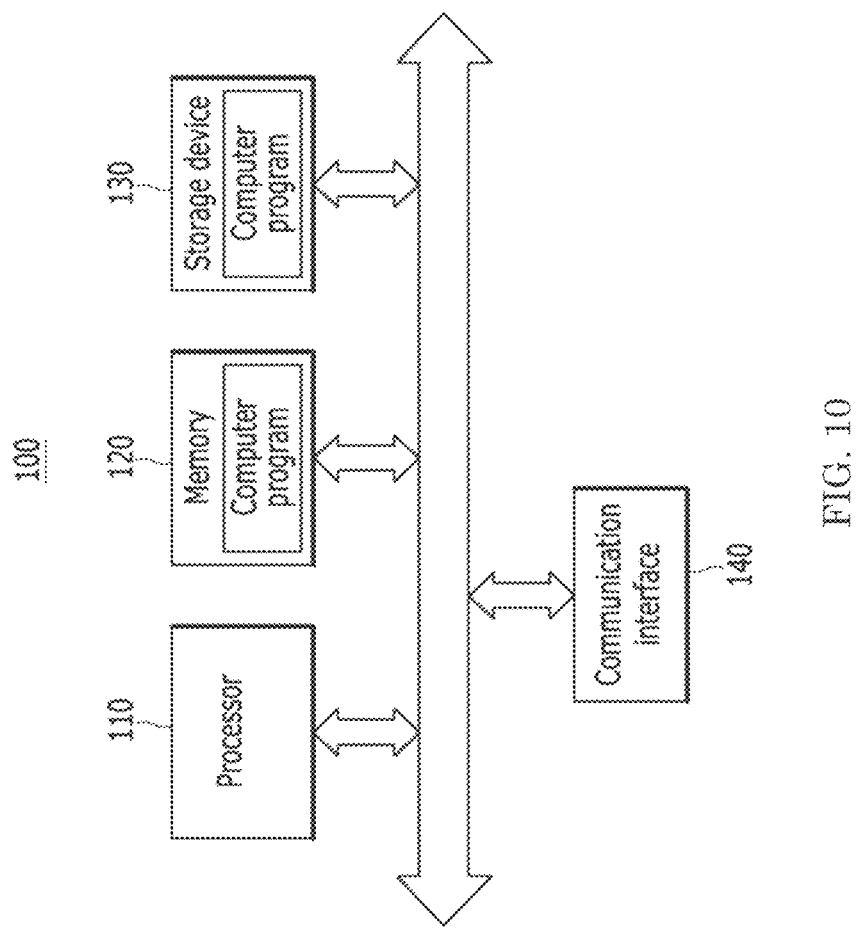
FIG. 10 is a block diagram of a management server according to an example.

FIG. 10 is a block diagram of a management server according to an example.

Referring to FIG. 10, the management server 100 may include a processor 110 to execute instructions of a computer program, a memory 120, a storage device 130, and a communication interface 140, which may be connected by a bus therebetween. Examples of the processor 110, the memory 120, the storage device 130, and the communication interface 140 may be similar to those of the processor 210, the memory 220, the storage device 230, and the communication interface 240 described above. The computer program may include instructions described to perform example operations of the present disclosure. The computer program of the management server 100 may be stored in a non-transitory computer readable storage medium.

The computer program of the management server 100 may include instructions for receiving a group creation request for synchronizing application configurations, instructions to group devices included in the group creation request into groups, instructions for assigning a group identifier, instructions for transmitting the group identifier to devices included in the group, instructions for mapping configuration data of an application to the group identifier and for storing the mapped configuration data, and instructions for transmitting the configuration data to devices belonging to the group.

The computer program of the management server 100 may include instructions for receiving a request for configuration data of a specific application from a device included in the group, and instructions for transmitting configuration data of the requested application to the requesting device.

The computer program of the management server 100 may include instructions for receiving the changed configuration data of the application from a device, and instructions for mapping the configuration data to a group identifier and for storing the mapped configuration data. The computer program of the management server 100 may include instructions for checking an authority of an administrator who has requested group propagation, and instructions for inquiring of a master administrator with group management authority whether to approve of the group propagation for the configuration data changed in a device 200-1 when a higher authority is required for group propagation in an allowance policy, and instructions for mapping and storing the configuration data of an application changed in the device when the approval of the group propagation is obtained.

The examples of the present disclosure described above are not limited to implementation only through an apparatus and a method but may be implemented through a program for realizing a function corresponding to the configuration of the examples of the present disclosure or a recording medium on which the program is recorded.

Although examples of the present invention have been described above, the scope of the present invention is not limited thereto, and various modifications and improvements by those skilled in the art using the basic concept of the present invention defined in the following claims are also provided.

What is claimed is:

1. A method of operating a management server, the method comprising:
creating a group for synchronizing an application configuration;
transmitting a group identifier of the group to devices included in the group;
mapping configuration data of an application to the group identifier;
storing the mapped configuration data; and
transmitting the configuration data of the application to at least one device included in the group.

2. The method of claim 1, wherein the transmitting of the configuration data to the at least one device comprises, when a change in the configuration data of the application is detected, transmitting the changed configuration data to the at least one device included in the group.

3. The method of claim 1, wherein the transmitting of the configuration data to the at least one device comprises, upon receiving a request for the configuration data of the application mapped to the group identifier from a certain device included in the group, transmitting the configuration data of the application to the certain device.

4. The method of claim 1, wherein the transmitting of the configuration data to the at least one device comprises pushing the configuration data of the application to the at least one device included in the group.

5. The method of claim 1, wherein the mapping of the configuration data of the application to the group identifier comprises:
fetching, from a certain device included in the group, the configuration data of the application changed in the certain device;
mapping the fetched configuration data of the application to the group identifier; and
storing the mapped configuration data.

6. The method of claim 5, wherein the mapping of the configuration data of the application to the group identifier comprises:
checking an authority of an administrator that requests group propagation of the configuration data of the application; and
when a higher authority is required for the group propagation, obtaining an approval of the group propagation from a higher administrator, mapping the configuration data of the application fetched from the certain device to the group identifier, and storing the mapped configuration data.

7. The method of claim 1, wherein the mapping of the configuration data of the application to the group identifier comprises:
receiving the configuration data of the application from an administrator terminal;
mapping the received configuration data of the application to the group identifier; and
storing the mapped configuration data.

8. The method of claim 7, wherein the transmitting of the configuration data of the application comprises, when a change in the configuration data of the application is detected, transmitting the changed configuration data of the application to the at least one device included in the group.

9. The method of claim 1, further comprising:
providing a group configuration page of a new device to an administrator terminal;
receiving a request to add the new device to the group in the group configuration page; and
transmitting the group identifier to the new device.

10. A method of operating a device, the method comprising:
receiving a group identifier from a management server and storing the group identifier in a storage;
when configuration data of an executed application is changed, checking whether the group identifier exists in the storage, wherein the group identifier is mapped to the application;
displaying a message inquiring whether to propagate the changed configuration data of the application to a group to which the group identifier is assigned when the group identifier exists; and
when receiving a request to propagate the changed configuration data to the group, providing the changed configuration data to the management server.

11. The method of claim 10, wherein the providing of the changed configuration data to the management server comprises, upon receiving the request to propagate to the group, recording the request to propagate the changed configuration data of the application and providing the changed configuration data to the management server that has checked the request.

12. A device comprising:
a memory; and
a processor to execute instructions stored in the memory, wherein the processor, by executing the instructions stored in the memory, is to:
store at least one group identifier received from a management server in a storage;
when a configuration of an executed first application is changed, check whether a group identifier mapped to the first application exists in the storage; and
when receiving a group propagation request for changed configuration data of the first application, provide the changed configuration data of the first application to the management server.

13. The device of claim 12, wherein, when a second application is executed, the processor is to check whether a group identifier mapped to the second application exists in the storage, fetch the configuration data of the second application from the management server, and apply the fetched configuration data to the second application.

14. The device of claim 13, wherein the processor is to receive the configuration data of the second application mapped to the group identifier and apply the stored configuration data of the second application to the second application when the second application is executed.

15. The device of claim 12, wherein the processor is to:
display a message inquiring whether to apply the changed configuration data of the first application to the group to which the group identifier is assigned;
when receiving the group propagation request, record the group propagation request for the changed configuration data of the application; and provide the changed configuration data of the application for which the group propagation request is recorded to the management server that has checked the group propagation request.

\* \* \* \* \*